United States Patent Office 3,452,720
Patented July 1, 1969

3,452,720
HEAT STORAGE HEAT EXCHANGER
Willis Thompson Lawrence, Arlington, Mass., assignor, by mesne assignments, to Hooker Chemical Corporation, Niagara Falls, N.Y., a corporation of New York
Filed Nov. 7, 1966, Ser. No. 592,450
Int. Cl. F22b 1/02, 21/00
U.S. Cl. 122—32                                    13 Claims

ABSTRACT OF THE DISCLOSURE

A heat exchanger for vaporizing liquids, especially suitable for extracting heat from a heat-storage container of material which solidifies at the lower end of a heat storage cycle, comprising a conduit traversing the heat storage material and connecting an inlet and an outlet via an open ascending coil having turnings of at least two different diameters forming a multilevel alternating distribution of larger and smaller diameter turnings.

---

Figure 1:
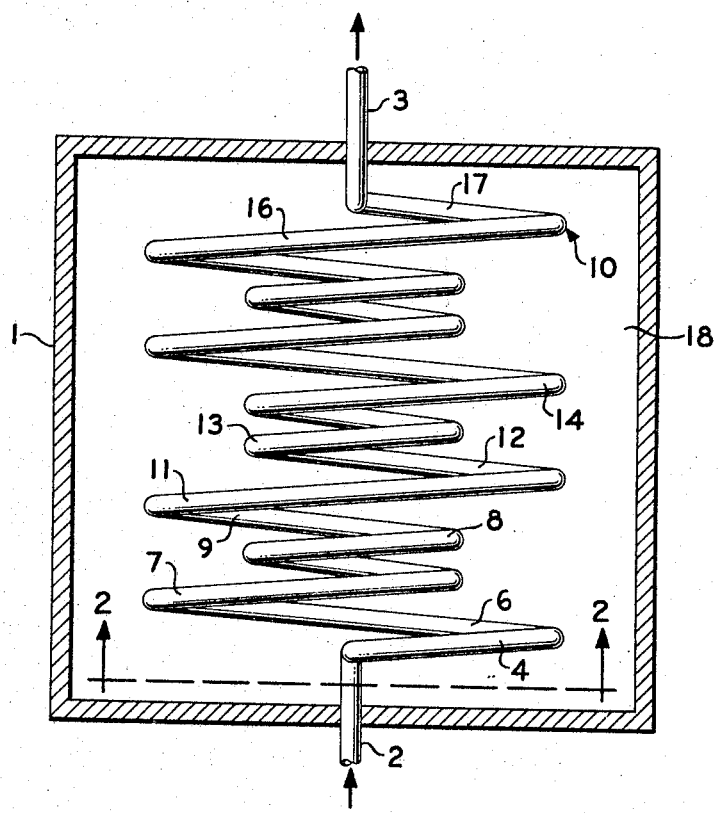

This invention relates to a heat exchanger or vaporizer apparatus particularly useful for extracting heat from a heat-storage unit of the type comprising a container for heat-storage material, such as alkali metal hydroxides, for instance sodium hydroxide, which may be cycled through a wide range of temperatures and which solidifies at the lower end of the range. More particularly it relates to coiled vaporizer apparatus which is disposed in a heat-storage material and connected in a circuit having a heat exchanger, such as a vapor condenser, in water to be heated, air to be heated or the like, the water or other heat carrying liquid being vaporized in the vaporizer and condensed in the condenser, the water then being returned to the vaporizer.

Various ways have been proposed to obtain rapid extraction of heat from a heat storage unit with a vaporizer in which the coils are distributed within the heat-storage material. One way is to use a vaporizing coil which spirals upwardly and thence downwardly through different portions of the material with its inlet and outlet at the bottom of the unit. Such a vaporizer is unsatisfactory for many uses because such a design does not promote stratified cooling of the heat-storage material as is often desired, and further, such prior configurations permitted water to be trapped in the coil when the unit cooled below the boiling point of water. Thus, when the unit was reheated, the mass of trapped water vaporizes rapidly, causing "slugging" of the water as well as undesirable sounds. Further, such deficiencies resulted in less than the desired control of the heat transfer of the stored heat to the end use. By placing the vaporizer above the condenser the water may flow into the condenser instead of being trapped, but this arrangement is undesirable in many instances. Another previous method for obtaining rapid heat extraction was to employ a plurality of coils in parallel with a common water inlet at the bottom and a common vapor outlet at the top. While this avoids the aforesaid trapping, it involves other difficulties such as maintenance of equal flow through the parallel coils. If the flow rate is not maintained equally in the parallel coils, nonuniform cooling results in the heat storage composition and causes the temperature distribution throughout the heat-storage material to be less uniform than that which is obtained with the present invention.

An object of the present invention is to obtain rapid heat extraction while providing the desired advantage of stratified cooling but without the previous accompanying disadvantages. Another object of the present invention is to provide a vaporizer which provides the heat transfer of a plurality of coils while being simple and economical to construct and which is compact, durable and reliable in use.

In accordance with the invention, a heat exhanger for vaporizing liquids is provided comprising a conduit for the passage of liquids having an inlet means and an outlet means, said conduit comprising an ascending coil having turnings of at least two different diameters, said turnings of different diameters being interspersed with each other to provide a multilevel and multidiameter distribution of coil surfaces. In particular, the present heat exchanger is used in combination with a substantially anhydrous alkali metal hydroxide high temperature heat storage composition, preferably being submerged therein. Preferably, when a cylindrical container and correspondingly shaped coil are used, each turn of a given coil is of approximately a constant radius throughout its periphery.

The rapid heat withdrawal resides in the distribution of the single coil throughout the medium. The mode of operation is as follows. With the system hot, water at a fixed flow rate enters the bottom of the coil and is converted to steam. It is quickly superheated to the initial temperature of the heat storage material and passes through the rest of the coil without removing any additional heat. Thus the temperature of the exiting steam is independent of the flow rate at this point, but the rate of heat extraction is directly proportional to the flow rate, and for a fixed flow rate, remains constant. As the bottom of the heat storage container is cooled, the point at which the steam reaches the initial temperature of the storage material moves gradually along the coil upwardly in the heat storage container. During most of a cycle, the steam coming from the heat storage container is at a constant high temperature (300 to 1200 degrees Fahrenheit). Thus the ascending coil arrangement by maintaining a reservoir of high temperature storage material in the upper portion of the tank permits heat to be withdrawn at a constant rate during most of an operating cycle without modulating the flow of water through the coil. At the very end of a cycle, the steam temperature becomes dependent on the flow rate when no reservoir of heat remains. This condition is undesirable and the main purpose of this invention is to postpone this condition until most of the stored heat has been removed.

In the most preferred embodiment the heat exchange coil is positioned in a container of heat-storage material such as substantially anhydrous sodium hydroxide, the conduit progressing through the container in a series of windings in coil-like configuration, said windings being of different diameters interspersed or distributed among each other to provide a wide distribution of the surfaces of the coils throughout the heat-storage material.

Figure 2:
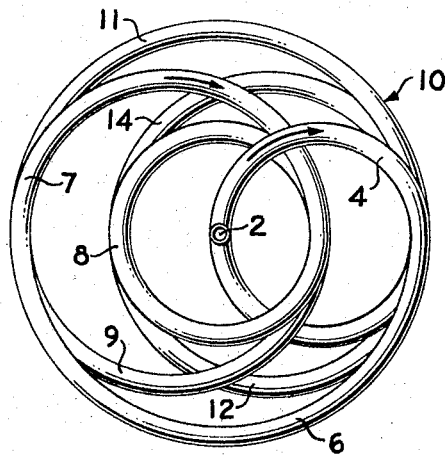

For the purpose of illustration, a typical embodiment of the invention is shown in the accompanying drawing in which FIG. 1 is a side sectional view of the coil apparatus of the present invention shown positioned in a heat storage container for a substantially anhydrous alkali metal hydroxide composition, and;

FIG. 2 is a bottom plan view of the coil apparatus of FIG. 1 along line 2—2.

In the illustrated embodiment the container for the heat-storage material 1 preferably encloses the coil conduit 10, which in the preferred embodiment, is surrounded by an anhydrous alkali metal hydroxide composition such as a sodium hydroxide composition. Extending upwardly through container 1 and the heat storage material is conduit 10 through which is passed water to be vaporized or other heat transfer fluid. The conduit has an inlet 2 extending preferably from the bottom or lower portion of the container and an outlet 3 extending from the top or upper portion of the container. Interconnecting the inlet and outlet are a series of large and small coils interspersed between each other as aforesaid. Progressing from bottom to top of the conduit is a series of radial loop configurations beginning with portion 4 leading outwardly to a first large coil 6, subsequently leading inwardly in portion 7 from the large coil to a small coil 8, from whence portion 9 leads outwardly from the small coil to the next large coil 11, from whence portion 12 leads inwardly to the next small coil 13 from whence portion 14 leading outwardly to the next large coil and so on, alternating large and small coils to the portion 17 leading from the top large coil 16 to the outlet 3.

Although the sizes of the turnings or coils of the present invention have been described as large and small, such description is to be understood as being comparative to each other and the heat storage container in which the apparatus is positioned. Of course, it is readily apparent that the present invention is not limited to just two coil diameters. In certain embodiments, it may be desirable to use 3, 4 or even more diameters in the manner and spirit of the present invention. The term "diameter" is used in the sense to indicate the circumference, radius of curvature and the like and is not intended as a term limiting the shape of the coils to circular because the shape of such coils is preferably made to conform to the shape of the heat-storage container.

The heat-storage container is preferably cylindrical but can also be square, rectangular, elliptical and the like in cross section and the coils are preferably shaped accordingly to thereby be distributed throughout the heat storage composition. Of course, coils of circular configuration can be used with a square container or some other such combination with correspondingly good results.

In this way coils may be distributed widely throughout the body of heat-storage material while providing the advantages of stratified cooling described above but with none of the aforesaid disadvantages of the prior art.

As has been clearly taught herein, although water is the most preferred heat transfer fluid because of its specific heat characteristics other heat exchange fluids can be used particularly high temperature resistant organic liquids.

The present invention is particularly useful for extracting heat from molten substantially anhydrous alkali metal hydroxide compositions. Such compositions normally resist heat extraction due to the physical characteristics of the solid and molten material. While in the fused or molten state, that is, at a temperature of about 450 to 1200 degrees Fahrenheit, molten caustic compositions circulate readily because of their low viscosities and thus they transfer heat by convection at relatively high rates. However, in the solidified state, that is at temperatures below about 450 degrees Fahrenheit, caustic compositions have very poor heat conductive properties, and are relatively good insulators. As heat is withdrawn from such a system, the caustic rapidly solidifies around the heat exchanger, that is, the coil conduit, making the further extraction of heat difficult because of the insulating effect of the caustic. Such effect is greatly mitigated using the present invention which passes the heat exchange surface through a large area of the heat-storage material thereby placing the vast bulk of the caustic within a relatively short distance of a heat exchange surface while providing for the stratification of the heat storage composition by the continuous rise of the heat exchange fluid as it passes through the coil conduit as described above.

The following example illustrates certain preferred embodiments of the present invention. In the example, unless otherwise stated, all parts and percentages are by weight and all temperatures are in degrees Fahrenheit.

*Example*

An apparatus of the present invention was constructed in the manner of the drawings and housed within a container filled with a substantially anhydrous alkali-metal hydroxide composition comprising about 89 percent sodium hydroxide, 8 percent sodium nitrate and about 2 percent sodium chloride, the remainder being primarily sodium carbonate. The composition was heated to a temperature of about 900 degrees Fahrenheit. Heat was subsequently extracted from this composition by passing water at a temperature of 70 to 150 degrees Fahrenheit into the bottom inlet of the conduit. As the water passed through the coiled conduit, steam was formed and subsequently superheated to a temperature about aqual to the highest temperature with the heat storage container, that is about 900 degrees Fahrenheit. The superheated steam was then passed to a condenser submerged in water to be heated. The steam was therein condensed, thereby giving up its sensible heat and heating the water surrounding the condenser to the desired temperature interval of 100 degrees Fahrenheit. By using this heat storage system a much larger amount of heat could be stored in the sodium hydroxide composition for a given volume compared to storing the heat in water, which heat was immediately available for the end use.

In a like manner, various other high temperature organic and inorganic heat exchange fluids particularly aromatic and aliphatic organic compounds such as aliphatic halocarbons, halogenated hydrocarbons, aromatics such as diphenyl and diphenyl oxides, halogenated aromatics such as dichlorobenzene and the like are used with correspondingly good results.

While there have been described various embodiments of the invention, the methods and elements described are not intended to be understood as limiting the scope of the invention as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principles may be utilized.

What is claimed is:

1. A heat exchanger for vaporizing liquids comprising a conduit for the passage of a liquid having an inlet means and an outlet means, said conduit comprising an eccentric, continuously ascending coil, said coil comprising interspersed turnings of at least two different diameters, each turning being spaced from the adjacent turning to define an inclined path for the passage of said liquid and provide an open, multilevel and multidiameter distribution of larger and smaller diameter turnings.

2. The apparatus of claim 1 wherein each turn has approximately a constant radius throughout its periphery.

3. The apparatus of claim 1 wherein the turnings of the coils are of two different diameters.

4. A heat storage and heat exchange apparatus comprising a container for a heat-storage material and disposed within said container a conduit for the passage of a liquid to be vaporized said conduit having an inlet means and an outlet means and comprising an eccentric, continuously ascending coil, said coil comprising interspersed turnings of at least two different diameters, each turning being spaced from the adjacent turning to define an inclined path for the passage of said liquid and provide an open, multilevel and multidiameter distribution of larger and smaller diameter turnings.

5. The apparatus of claim 4 in which said container for a heat storage medium contains an alkali metal hydroxide heat storage composition.

6. A method of storing and transferring heat which comprises, heating a substantially anhydrous alkali metal hydroxide composition to a temperature between about 300 to 1200 degrees Fahrenheit, passing a fluid in heat exchange contact through said heated composition in a continuously ascending, eccentric path of interspersed large and small diameter turnings of at least two different diameters, each turning being spaced from the adjacent turning to define an inclined path for the passage of said fluid in an open, multilevel and multidiameter distribution of larger and smaller diameter turnings, and withdrawing said heated fluid.

7. The method of claim 6 wherein the alkali metal hydroxide is sodium hydroxide.

8. The method of claim 6 wherein the fluid is water.

9. The method of claim 8 wherein said water is heated to superheated steam.

10. The method of claim 6 wherein the composition is heated to a temperature of 600 to 1200 degrees Fahrenheit.

11. A method according to claim 6 wherein the anhydrous alkali metal hydroxide is cooled by the fluid being heated until the bottom portion thereof solidifies.

12. A method according to claim 6 wherein the cooling of the alkali metal hydroxide occurs sequentially from bottom to top thereof.

13. A method according to claim 12 wherein the fluid is water and the water is withdrawn as superheated steam.

References Cited

UNITED STATES PATENTS

| | | | |
|---|---|---|---|
| 681,722 | 9/1901 | Mott | 122—250 |
| 967,961 | 8/1910 | Olson | 122—250 |
| 1,839,392 | 1/1932 | Humphrey | 122—250 XR |
| 2,808,494 | 10/1957 | Telkes | 126—400 XR |
| 2,878,644 | 3/1959 | Fenn | 122—32 XR |
| 2,936,741 | 5/1960 | Telkes | 126—400 XR |
| 3,163,209 | 12/1964 | Shinn | 126—400 XR |

K. W. SPRAGUE, *Primary Examiner.*

U.S. Cl. X.R.

122—250